(12) United States Patent
Sakurano et al.

(10) Patent No.: US 11,796,650 B2
(45) Date of Patent: Oct. 24, 2023

(54) LIGHT RECEIVER AND RANGING DEVICE

(71) Applicant: Ricoh Company, Ltd., Tokyo (JP)

(72) Inventors: Katsuyuki Sakurano, Hyogo (JP); Toshiki Yamanaka, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 451 days.

(21) Appl. No.: 17/134,749

(22) Filed: Dec. 28, 2020

(65) Prior Publication Data

US 2021/0270939 A1 Sep. 2, 2021

(30) Foreign Application Priority Data

Mar. 2, 2020 (JP) ................. 2020-035067

(51) Int. Cl.
*G01S 7/00* (2006.01)
*G01S 7/487* (2006.01)
*G01S 7/4863* (2020.01)

(52) U.S. Cl.
CPC ............ *G01S 7/487* (2013.01); *G01S 7/4863* (2013.01)

(58) Field of Classification Search
USPC .............................. 356/4.01, 5.01
See application file for complete search history.

(56) References Cited

U.S. PATENT DOCUMENTS

| 4,410,261 | A | * | 10/1983 | Masunaga | ................. | G02B 7/30 |
| | | | | | | 396/125 |
| 11,002,598 | B2 | * | 5/2021 | Ta | .......................... | G01S 7/4865 |
| 11,069,823 | B2 | * | 7/2021 | Kuroda | .................. | H01L 27/144 |
| 2013/0147999 | A1 | * | 6/2013 | Hisamatsu | .............. | H03M 1/12 |
| | | | | | | 348/308 |
| 2015/0326811 | A1 | * | 11/2015 | Nishida | ................... | H04N 25/75 |
| | | | | | | 348/308 |
| 2015/0338866 | A1 | * | 11/2015 | Hu | .......................... | G05F 1/575 |
| | | | | | | 323/280 |
| 2019/0305146 | A1 | | 10/2019 | Kuroda | | |
| 2020/0064186 | A1 | | 2/2020 | Ta et al. | | |

FOREIGN PATENT DOCUMENTS

| JP | 2019-158806 | 9/2019 |
| JP | 2020-150001 | 9/2020 |

OTHER PUBLICATIONS

Extended European Search Report dated Jun. 11, 2021 in European Patent Application No. 20215949.7, 9 pages.

* cited by examiner

*Primary Examiner* — James R Hulka
(74) *Attorney, Agent, or Firm* — XSENSUS LLP

(57) ABSTRACT

A light receiver includes a plurality of photoelectric conversion portions each of which includes a photoelectric conversion element configured to receive light, and a pulse generator configured to generate a pulse signal corresponding to an amount of light received by the photoelectric conversion element. The light receiver includes a plurality of bit counters each of which is configured to count the pulse signal of the pulse generator, and the plurality of bit counters are dispersed in the plurality photoelectric conversion portions.

8 Claims, 9 Drawing Sheets

TFF15   TFF0

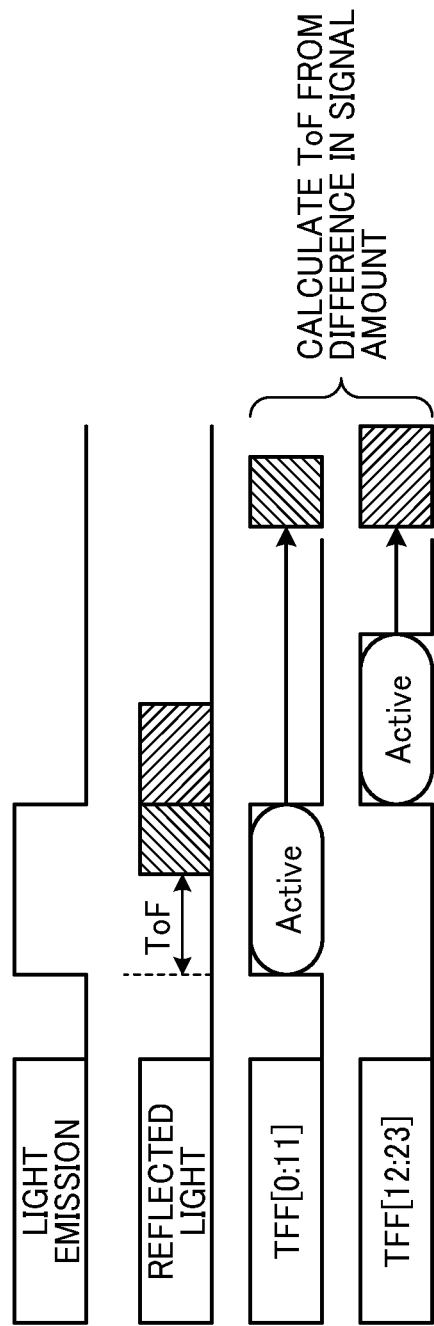

120# LIGHT RECEIVER AND RANGING DEVICE

CROSS-REFERENCE TO RELATED APPLICATION

This patent application is based on and claims priority pursuant to 35 U.S.C. § 119(a) to Japanese Patent Application No. 2020-035067, filed on Mar. 2, 2020, in the Japan Patent Office, the entire disclosure of which is hereby incorporated by reference herein.

BACKGROUND

Technical Field

The present disclosure relates to a light receiver and a ranging device.

Related Art

Currently, single photon avalanche diode (SPAD) sensors, which are single photon detection elements, are known. A SPAD sensor has a capability to operate in a Geiger mode in which a reverse voltage exceeding the breakdown voltage is applied to a p-n junction to drive the sensor. Therefore, a SPAD sensor can attain a much higher gain than that attained by an avalanche photo diode (APD) and can react with a very small signal unit of one photon. Note that the gain of the SPAD sensor is about 1E6, while the gain of the APD is about 100 to 200.

The SPAD sensor requires quenching after reacting to photons, to reduce the current due to the Geiger mode. Further, after reducing the current in the Geiger mode by the quenching, the SPAD sensor requires recharge control for supplying electric charges until the SPAD sensor returns to a steady mode. Both the quenching and recharge control are performed using a resistor connected in series with the SPAD sensor. The resistor is, for example, on-resistance of a metal-oxide semiconductor field-effect transistor (MOSFET). Further, since the output signal is a digital pulse, a counter circuit or the like is used for the SPAD sensor to maintain the signal for each pixel.

SUMMARY

According to an embodiment of this disclosure, a light receiver includes a plurality of photoelectric conversion portions each of which includes a photoelectric conversion element configured to receive light, and a pulse generator configured to generate a pulse signal corresponding to an amount of light received by the photoelectric conversion element. The light receiver includes a plurality of bit counters each of which is configured to count the pulse signal of the pulse generator, and the plurality of bit counters are dispersed in the plurality photoelectric conversion portions.

According to another embodiment, a ranging device includes a light source configured to emit light to an object, the above-described light receiver, and a control circuit. In response to a detection result that a phase difference between the output signal from the higher-bit counter circuit and the output signal from the lower-bit counter circuit in the first mode is 0, the control circuit calculates ½ of a time of emission of the light from the light source to the object as a time to reception of reflected light of the light emitted to the object.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a diagram illustrating calculation when the SPAD sensor illustrated in FIGS. 8 and 9 is used as an indirect time-of-flight (ToF) sensor.

Figure 1:
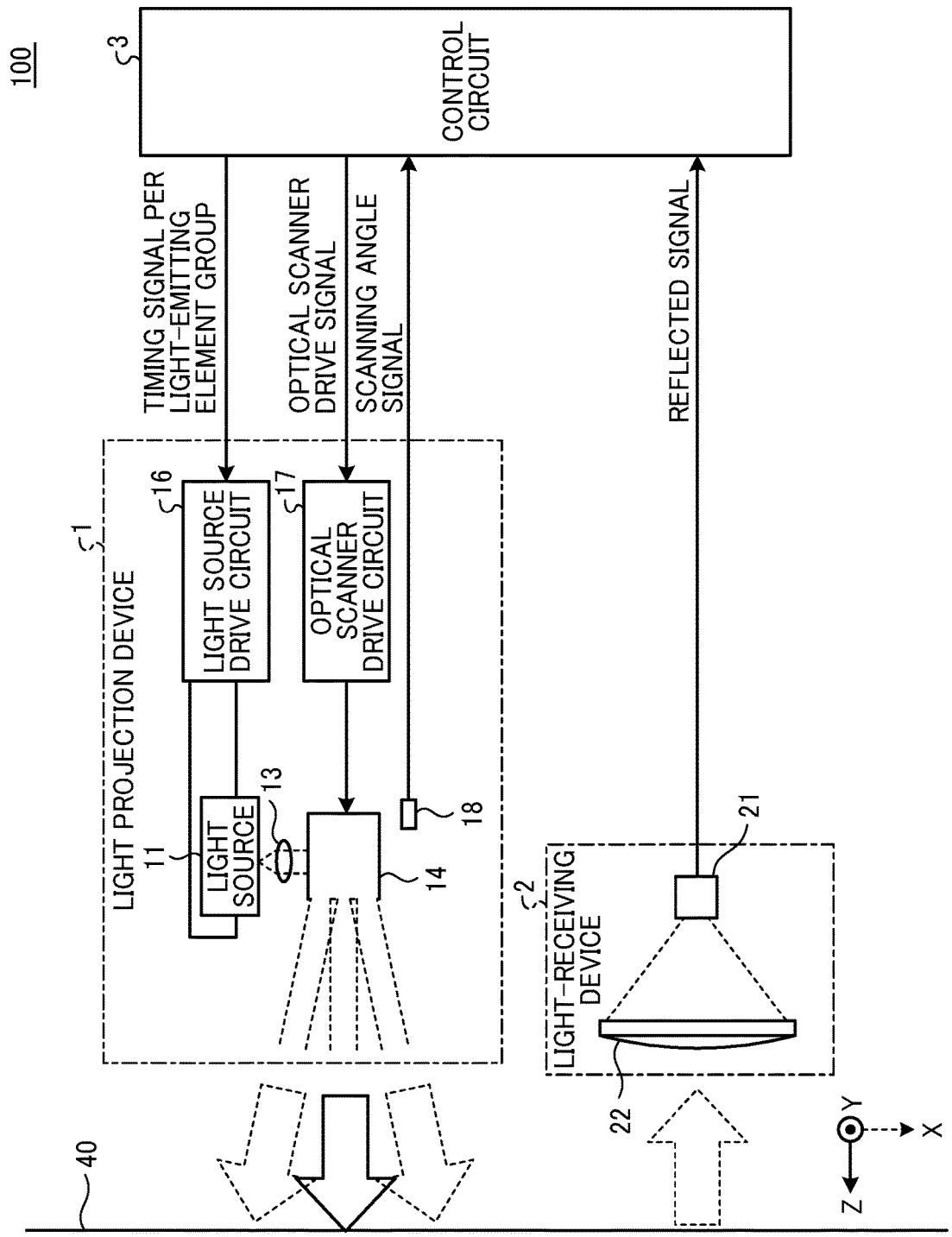
FIG. 1 is a block diagram illustrating a main configuration of a laser imaging detection and ranging (LIDAR) apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, embodiments according to the present disclosure are described. As used herein, the singular forms "a," "an," and "the" are intended to include the plural forms as well, unless the context clearly indicates otherwise.

Hereinafter, a description is given below of a laser imaging detection and ranging (LIDAR) apparatus according to an embodiment of the present disclosure with reference to the accompanying drawings. The LIDAR apparatus is configured to measure scattered light obtained by pulsed manner laser irradiation, thereby measuring the distance to an object, or analyzing the properties of the object. In other words, the LIDAR apparatus is an active ranging device including a light-emitting element.

A first embodiment is described below.

FIG. 1 is a block diagram illustrating a main part of a LIDAR apparatus 100 as a ranging device according to the first embodiment. In FIG. 1, the LIDAR apparatus 100 according to the first embodiment includes a light projection device 1 that projects light from a light source 11, a light-receiving device 2 that receives reflected light from an object 40, and a control circuit 3 that controls the light projection device 1 and measures the distance based on a reflection signal.

The light projection device 1 and the light-receiving device 2 are disposed to detect an object in a detection direction (image capture direction), which is generally the forward direction of a mobile body such as a vehicle, an aircraft, or a ship. Alternatively, the light projection device 1 and the light-receiving device 2 may be disposed to detect an object in a direction other than the forward direction, such as a lateral direction or the backward direction of the mobile body.

The light projection device 1 includes the light source 11, a coupling lens 13, an optical scanner 14, a light source drive circuit 16, an optical scanner drive circuit 17, and a scanning angle monitor 18.

The light source 11 includes a plurality of light-emitting element groups separate from each other in an optical scanning direction. Each light-emitting element group is constructed of a plurality of vertical cavity surface-emitting lasers (VCSELs). The light source 11 is connected to the control circuit 3 via the light source drive circuit 16. The control circuit 3 individually controls the respective light emission timings of the light-emitting element groups of the light source 11.

The coupling lens 13 couples the laser beam emitted from the light source 11 to the optical scanner 14. The optical scanner 14 performs scanning in the XZ plane by directing the laser beams from the plurality of light-emitting element groups of the light source 11 to the same detection area. With the deflection of the laser beam by the optical scanner 14, an object present in a predetermined angular range is detected, and the distance to the detected object can be measured.

The scanning angle of the laser beams by the optical scanner 14 may be detected by the scanning angle monitor 18 and fed to the control circuit 3. In this case, the control circuit 3 adjusts an optical-scanner drive signal based on the monitor result, and controls the scanning angle and the scanning frequency.

The light-receiving device 2 includes a single photon avalanche diode (SPAD) sensor 21 as an example of a light receiver and a light-receiving lens 22. A detail description of the SPAD sensor 21 is deferred. The light-receiving lens 22 couples the laser beam reflected from an object in the beam scanning direction, to the SPAD sensor 21 (the light receiver). Other optical devices such as a mirror may be disposed between the light-receiving lens 22 and the SPAD sensor 21 (the light receiver).

The light projection device 1 and the light-receiving device 2 are disposed close to each other. From a position several meters or more away from the light projection device 1 and the light-receiving device 2, respective optical axes of the light projection device 1 and the light-receiving device 2 can be regarded as coaxial. The laser beams are diffusely reflected from the object 40. Such diffusely reflected light includes an optical component returning along the same optical path as the laser beam emitted from the LIDAR apparatus 100, and the optical component passes through the light-receiving lens 22 and is received by the SPAD sensor 21 (the light receiver). The SPAD sensor 21 forms a reflection signal indicating the intensity of the received reflected light and supplies the reflection signal to the control circuit 3.

The control circuit 3 measures the distance to the detected object 40 based on the period from when the drive timing signal of the light source 11 is output to when the reflection signal is supplied, that is, based on the difference between the time at which the laser beams are emitted and the time at which the reflected light is received.

In this configuration, the quality of the laser beams output from each light-emitting element group is ensured, and a high angular resolution thereof is maintained. In addition, irradiating the same detection area with a plurality of laser beams at different timings is advantageous in enhancing the light intensity in total and increasing the measurable distance. Further, the SPAD sensor 21 used as the light receiver has high sensitivity and can obtain a reflection signal having a high signal-to-noise (SN) ratio. Therefore, the distance can be measured with high accuracy.

The control circuit 3 may be implemented by an integrated circuit chip, such as a large-scale integrated (LSI) chip or a microprocessor; a logic device such as a field programmable gate array (FPGA); or a combination of the integrated circuit chip and the logic device.

External Configuration of SPAD Sensor

The SPAD sensor 21, which serves as the light receiver of the LIDAR apparatus 100 according to the first embodiment, is a high-sensitivity image sensor capable of detecting a single photon. The SPAD sensor 21 is used to measure the time (time of flight) from emission of light to the object 40 to the return of reflected light from the object 40. Thus, the SPAD sensor 21 is used as a rangefinder.

Figure 2:
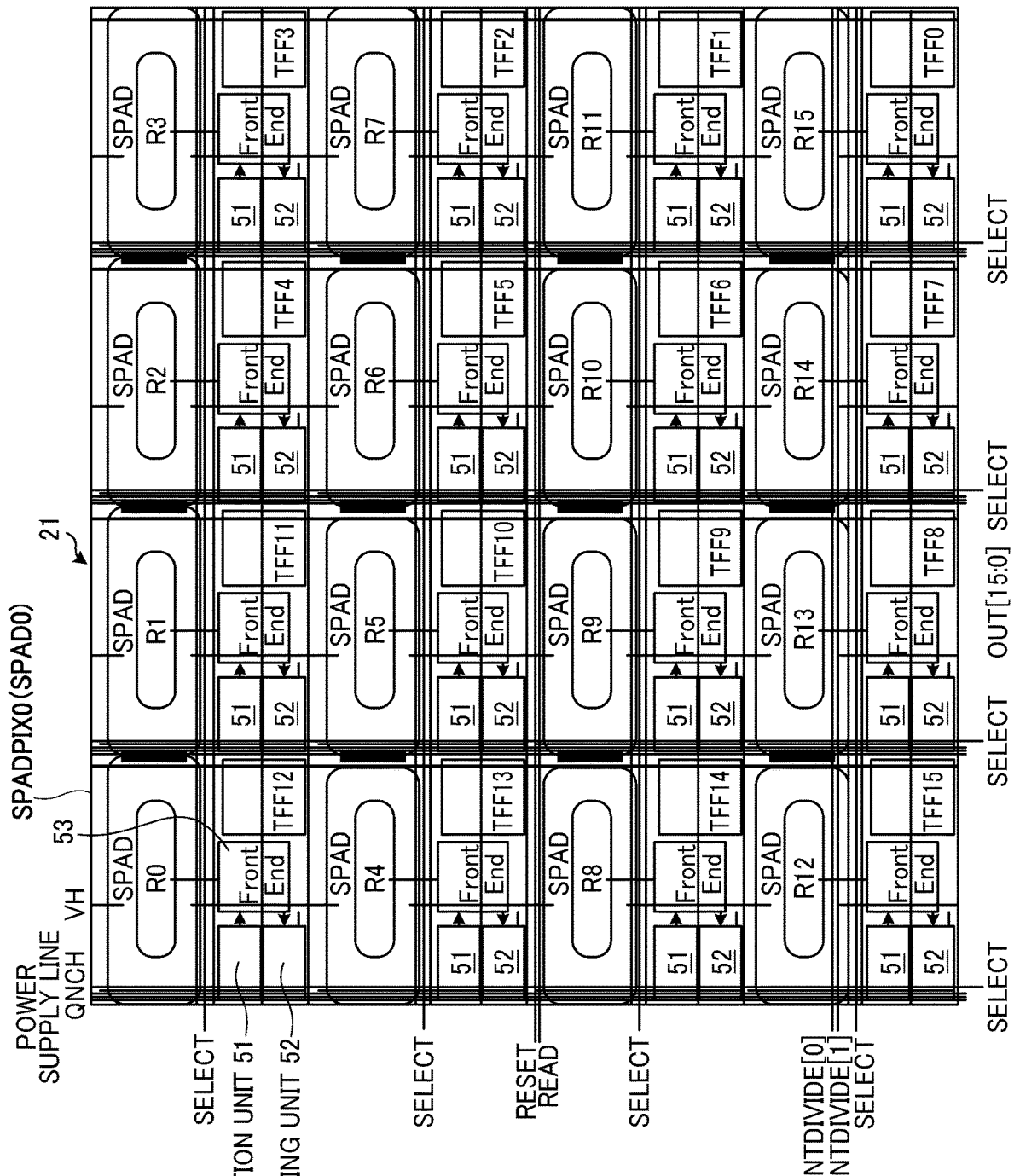
FIG. 2 is a diagram illustrating an external configuration of a single photon avalanche diode (SPAD) sensor, as a light-receiving element, of the LIDAR apparatus illustrated in FIG. 1.

FIG. 2 is a diagram illustrating an external configuration of the SPAD sensor 21 serving as the light receiver. In the example illustrated in FIG. 2, the SPAD sensor 21 has a pixel array of 16 pixels in total. The number of pixels in the pixel array can be greater than 16 or less than 16. Each of the pixels (e.g., SPADPIX0 on the upper left) is an example of a photoelectric conversion portion and provided with a SPAD (e.g., SPAD0) including a light-receiving areas R (R0 to R15). Each SPAD is an example of a photoelectric conversion element. Each pixel includes a pixel selection unit 51, a pulse shaping unit 52 (an example of a pulse generator), a front end 53, and a toggle flip flop (one of T flip-flops TFF0 to TFF15). The signal from the SPAD has a spike shape and has a pulse width too small for a subsequent-stage counter circuit to count. The pulse shaping unit 52 increases the pulse width of the SPAD. Each of the T flip-flops TFF0 to TFF15 is examples of a bit counter.

Figure 3:
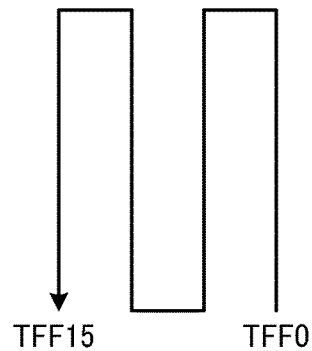
FIG. 3 is a diagram illustrating an example of a layout of toggle flip-flops allocated to pixels of the SPAD sensor illustrated in FIG. 2.

In FIG. 2, the 16 T flip-flops (0th to 15th T flip-flops TFF0 to TFF15) of the SPAD sensor 21 (the light receiver) are given reference characters TFF0 to TFF15. As illustrated in FIG. 3, TFF0 to TFF15 are continuously arranged in a so-called zigzag shape (meandering shape) and are dispersed in the pixels. Specifically, in FIG. 2, the 0th to 3rd T flip-flops TFF0 to TFF3 are disposed in order from the lower right pixel in the upward direction, and the 4th T flip-flop TFF4 is disposed adjacent to the left of the 3rd T flip-flop TFF3. The 5th to 7th T flip-flops TFF5 to TFF7 are disposed in order from the 4th T flip-flop TFF4 in the downward direction in FIG. 2. The 8th T flip-flop TFF8 is disposed adjacent to the left side of the 7th T flip-flop TFF7, and the 9th to 11th T flip-flops TFF9 to TFF11 are disposed in order from the 8th T flip-flop TFF8 in the upward direction in FIG. 2. The 12th T TFF12 is disposed adjacent to the left of the 11th T flip-flop TFF11, and the 13th to 15th T flip-flops TFF13 to TFF15 are disposed in order downward from the 12th T flip-flop TFF12 in FIG. 2. Thus, the T flip-flops TFF0 to TFF15 are sequentially disposed adjacent pixels (photoelectric conversion portions) in an order from a bit counter (e.g., the TFF0) configured to output a count value of a lowest bit to a bit counter configured to output a count value of a highest bit (e.g., TFF15).

The SPAD sensor 21 illustrated in FIG. 2 includes 16 T flip-flops TFF0 to TFF15 to count photons. Specifically, each pixel is provided with one of the T flip-flops TFF0 to TFF15. Therefore, the SPAD sensor 21 illustrated in FIG. 2 is a 16-bit counter. The number of bits of the entire SPAD sensor 21 determines the dynamic range of the amount of light that the SPAD sensor 21 can handle. Therefore, preferably, the number of bits of the entire SPAD sensor 21 is as large as possible (corresponding dynamic range becomes large).

Arranging the T flip-flops TFF0 to TFF15 adjacent to each other and continuous in this way is advantageous in keeping the wiring between the T flip-flops short, thereby reducing the wiring area. With the reduction of the wiring area, the aperture ratio of each pixel can be improved accordingly.

Further, as will be described later, the LIDAR apparatus 100 according to the first embodiment collectively detects the respective output signals of the pixels of the SPAD sensor 21 with one counter circuit (a 24-bit counter circuit 60 in FIG. 4). Further, as an external light removing method of the LIDAR apparatus 100, there is a method of regarding photons that are simultaneously incident on the pixels as signals, and removing the photons that are incident at random as external light. When such an external light removal method is used, collectively counting the outputs of the pixel of the SPAD sensor 21 with the 24-bit counter circuit 60 is useful.

Circuit Configuration of SPAD Sensor

Figure 4:
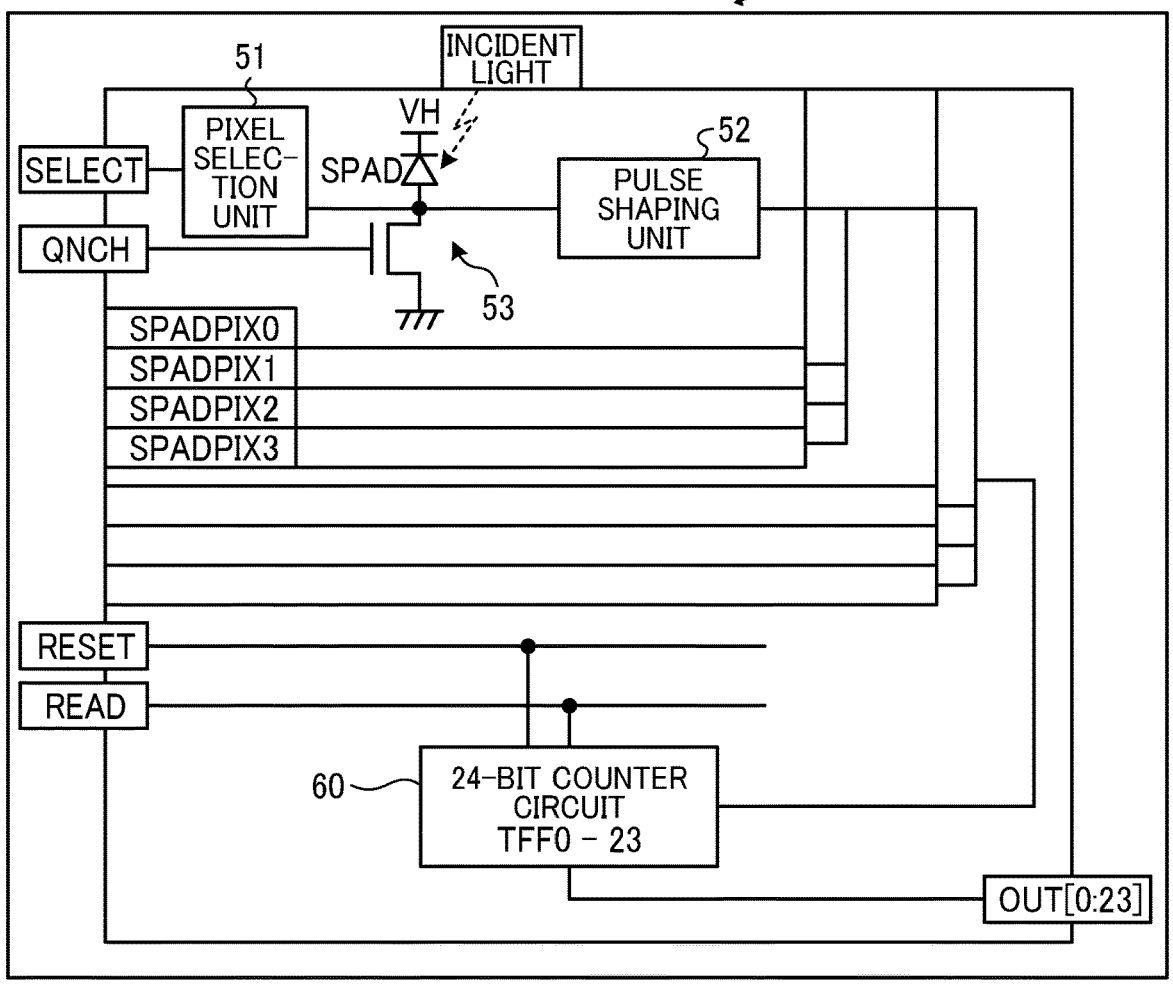
FIG. 4 is a diagram illustrating a circuit configuration of the SPAD sensor illustrated in FIG. 2.

FIG. 4 is a diagram illustrating a circuit configuration of the SPAD sensor 21 serving as the light receiver. In the example illustrated in FIG. 4, 16 pixel signals in total are collectively supplied to the 24-bit counter circuit 60 (an example of a counter circuit) provided with T flip-flops TFF0 to TFF23.

The 16 pixel signals are of:

the four pixels SPADPIX0 to SPADPIX3 respectively including the T flip-flops TFF0 to TFF3 illustrated in FIG. 2;

the four pixels SPADPIX4 to SPADPIX7 respectively including the T flip-flops TFF4 to TFF7;

the four pixels SPADPIX8 to SPADPIX11 respectively including the T flip-flops TFF8 to TFF11; and the four pixels SPADPIX12 to SPADPIX15 respectively including the T flip-flops TFF12 to TFF15.

The 24-bit counter circuit 60 generates a collective light-receiving signal.

The SPAD of each pixel operates in the Geiger mode with voltage (reverse bias voltage) equal to or higher than the breakdown voltage applied to a VH terminal. Further, the MOSFET of the front end 53 having the drain connected to the anode side of the SPAD functions as a quench resistor. The gate bias of the MOSFET is controlled by the gate voltage applied to a quench terminal QNCH, and the quench resistance value can be changed from the outside.

The 24-bit counter 60 counts each pulse signal output from each pixel in response to one photon. In addition, each pixel can be selectively activated by the selection signal from a SELECT terminal. Only the pixel selected by the selection signal is activated via the SELECT terminal, and the count output pulse of the number of photons is output. As a result, the count value of only a given pixel out of 16 pixels can be obtained.

The count value of the 24-bit counter circuit 60 is reset to "0" by a reset pulse supplied via a reset terminal RESET.

Further, the count value of the 24-bit counter circuit 60 is output to the outside via an output terminal OUT [0:23] by the read pulse supplied via a read terminal READ.

The first embodiments provides the following effects.

As is clear from the above description, the LIDAR apparatus 100 according to the first embodiment shares the single 24-bit counter circuit 60 among the plurality of pixels of the SPAD sensor 21. While switching the outputs from the 0th to 15th T flip-flops TFF0 to TFF15, which are allocated to the respective pixel of the SPAD sensor 21, the LIDAR apparatus 100 inputs the outputs into the single 24-bit counter circuit 60 and sequentially reads out the outputs. As a result, the logic circuit area of each pixel can be reduced, and the aperture ratio of the light-receiving area of each pixel can be increased.

Next, a description is given of a LIDAR apparatus according to a second embodiment.

The LIDAR apparatus 100 according to the first embodiment described above is an example in which the respective T flip-flops of the pixels of the SPAD sensor 21 are continuously arranged in a zigzag (meandering) shape. By contrast, the LIDAR apparatus 100 according to the second embodiment is an example in which the T flip-flops of the pixels of the SPAD sensor 21 are continuously arranged in a spiral shape. The second embodiment is different from the first embodiment described above only in the arrangement of the T flip-flops of the pixels of the SPAD sensor 21. Accordingly, only the difference is described below, and redundant description is omitted.

Figure 5:
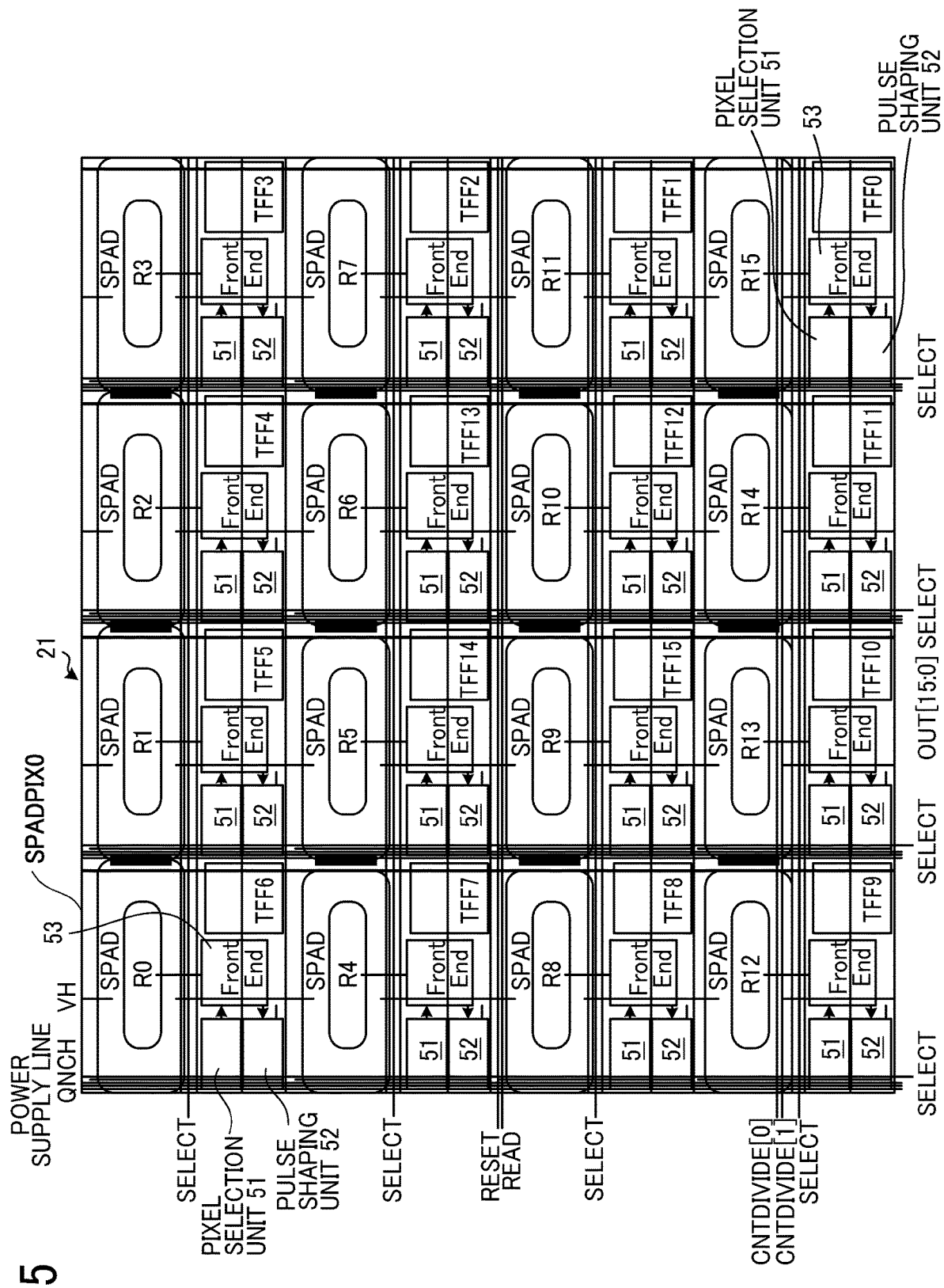
FIG. 5 is a diagram illustrating an external configuration of a SPAD sensor of a LIDAR apparatus according to a second embodiment.

FIG. 5 is a diagram illustrating an external configuration of the SPAD sensor 21 (the light receiver) of the LIDAR apparatus according to the second embodiment. In the second embodiment, similar to the first embodiment described above, the SPAD sensor 21 has an array of 16 pixels in total. Further, as described above, each pixel also includes the light-receiving area R (one of R0 to R15), the pixel selection unit 51, the pulse shaping unit 52, the front end 53, and one of the T flip-flops TFF0 to TFF15.

Figure 6:
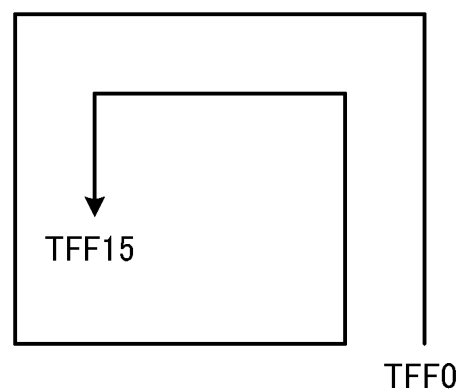
FIG. 6 is a diagram illustrating an example of a layout of T flip-flops allocated to pixels of the SPAD sensor illustrated in FIG. 5.

As illustrated in FIG. 6, the 0th to 15th T flip-flops TFF0 to TFF15 are continuously arranged in a so-called spiral shape. Specifically, in FIG. 5, the 0th to 3rd T flip-flops TFF0 to TFF3 are arranged in order from the lower right pixel in the upward direction. Further, the 3rd to 6th T flip-flops TFF3 to TFF6 are disposed in order from the right to the left on the top row of the SPAD sensor 21 in in FIG. 5. As a result, the 4th T flip-flop TFF4 is disposed adjacent to the left side of the 3rd T flip-flop TFF3 in FIG. 5.

Further, the 6th to 9th T flip-flops TFF6 to TFF9 are disposed in order from the upper left pixel in the downward direction in FIG. 5. The 10th and 11th T flip-flops TFF10 and TFF11 are disposed in order adjacent to the right side of the 9th T flip-flop TFF9 at the lower left on the bottom row of the SPAD sensor 21 in FIG. 5.

Further, the 12th and the 13th T flip-flops TFF12 and TFF13 are sequentially arranged in the upward direction from the 11th T flip-flop TFF11 in the bottom row of the SPAD sensor 21. Further, the 14th T flip-flop TFF14 is disposed adjacent to the left side of the 13th T flip-flop TFF13. Further, the 15th T flip-flop TFF15 is disposed adjacent to the lower side of the 14th T flip-flop TFF14. As a result, the 0th to 15th T flip-flops TFF0 to TFF15 are arranged in a spiral shape as illustrated in FIG. 6.

Arranging the 0th to 15th T flip-flops TFF0 to TFF15 adjacent to each other and continuous in a spiral shape is advantageous in keeping the wiring between the T flip-flops short and reducing the wiring area. Accordingly, the aperture ratio of each pixel can be improved. Thus, the second embodiment can attain effects similar to those attained by the first embodiment.

Next, a description is given of a LIDAR apparatus according to a third embodiment.

In the LIDAR apparatus according to the third embodiment, a color filter is provided on each of the pixels of the SPAD sensor 21 that includes the 0th to 15th T flip-flops TFF0 to TFF15 arranged continuously in a zigzag shape (serpentine shape) as described in the first embodiment.

Figure 7:
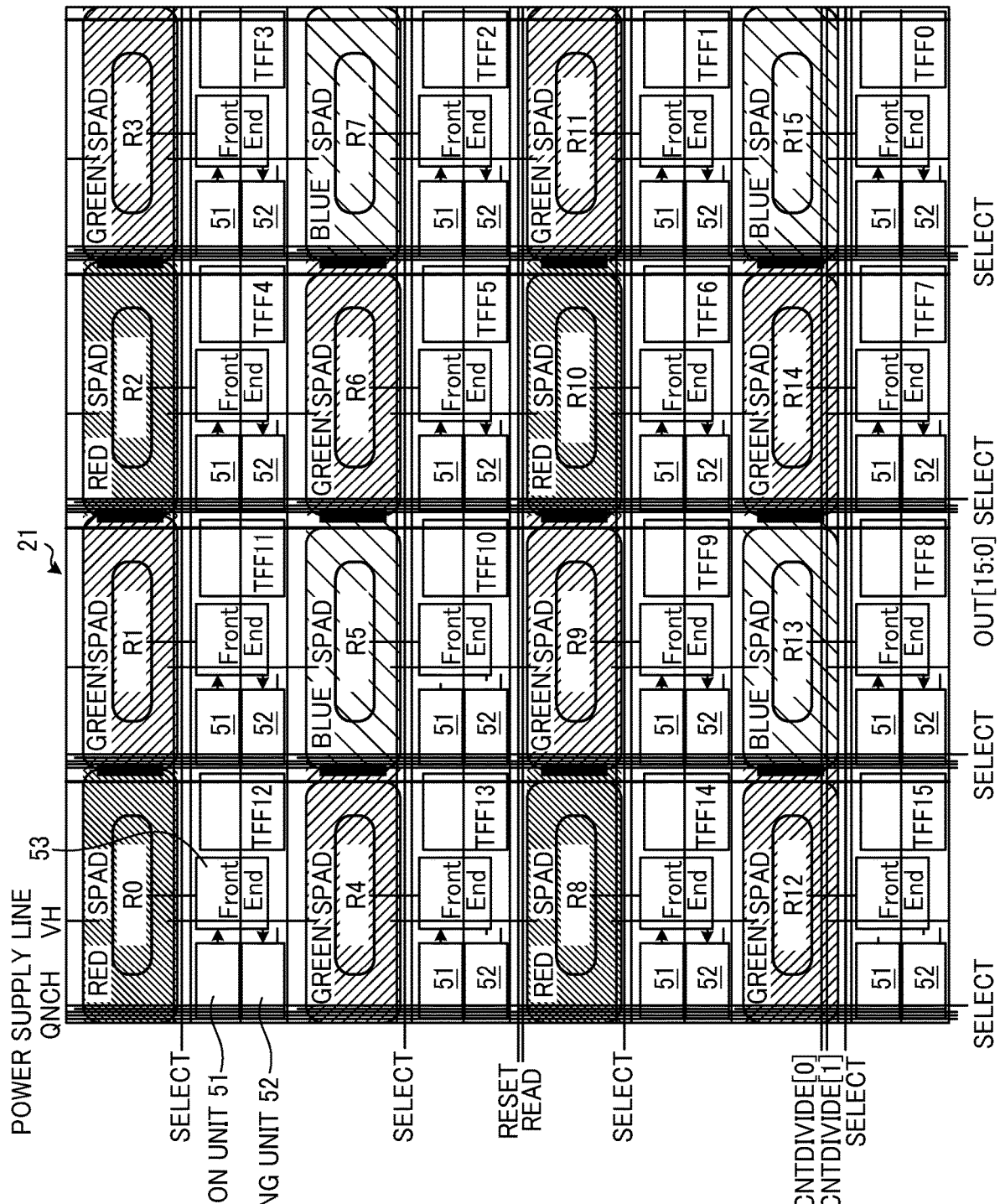
FIG. 7 is a diagram illustrating an external configuration of a SPAD sensor including a color filter provided for each pixel in a LIDAR apparatus according to a third embodiment.

FIG. 7 is a diagram illustrating an example of the SPAD sensor 21 including the color filter on each pixel. In the example illustrated in FIG. 7, 16 pixels in total are divided into square grids each of which includes 4 pixels (2 columns×2 rows). Each pixel grid includes green, red, and blue color filters in a ratio of 2:1:1 (Bayer color filter array).

With the Bayer color filter array on the four pixels, red, green, and blue (RGB) signals can be acquired with the four pixels. As described above in the first embodiment, the SPAD sensor 21 of the LIDAR apparatus collectively outputs the signals from four pixels. Therefore, the delay of the output signal due to the arrangement of the RGB color filters can be reduced, and the same effects as those of each of the above-described embodiments can be obtained.

Next, a description is given of a LIDAR apparatus according to a fourth embodiment.

In the LIDAR apparatus according to the fourth embodiment, the 24-bit counter circuit of the SPAD sensor 21 can be switched between a first mode and a second mode. In the first mode, the 24-bit counter circuit is used as the 24-bit counter to count outputs of the T flip-flops TFF0 to TFF23 as described above. In the second mode, the 24-bit counter circuit is used as a counter that separately counts outputs of the lower 12-bit T flip-flops TFF0 to TFF11 and the higher 12-bit T flip-flops TFF12 to TFF23.

As one example, a description is given of divided use of a 24-bit counter circuit into 12-bit counters, but the manner of division is not limited thereto. Alternatively, for example, a 36-bit counter circuit may be divided into three 12-bit counters, or a 36-bit counter circuit may be divided into two counters of a 24-bit counter and a 12-bit counter. The number of bits of the counter circuit, the number of divisions, and the number of bits of each of the divided counters can be arbitrarily set according to the design of the device.

An external configuration of the SPAD sensor 21 according to the fourth embodiment is described.

Figure 8:
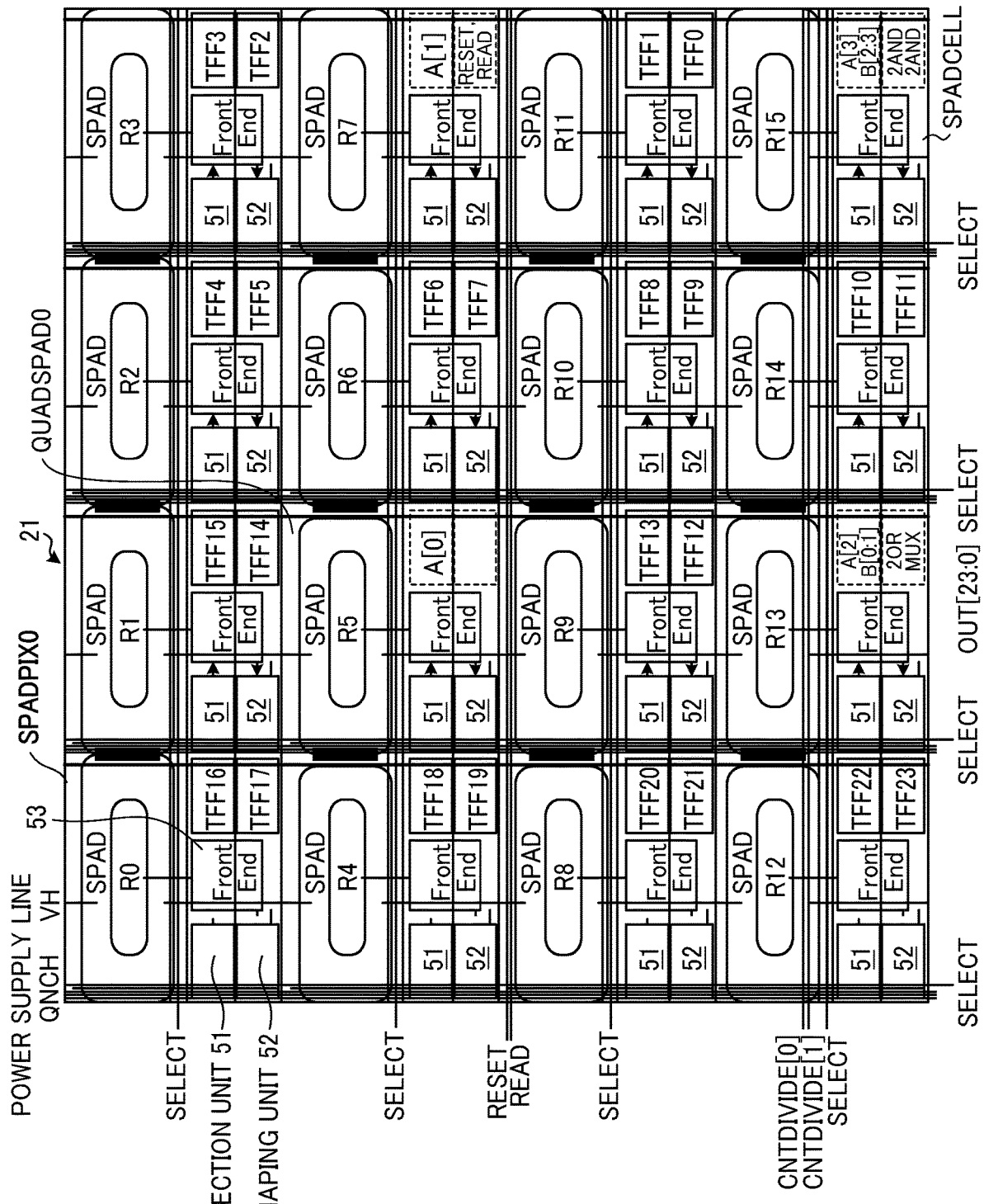
FIG. 8 is a diagram illustrating an external configuration of a SPAD sensor of a LIDAR apparatus according to a fourth embodiment.

FIG. 8 is a diagram illustrating an external configuration of the SPAD sensor 21 (the light receiver) of the LIDAR apparatus according to the fourth embodiment. As illustrated in FIG. 8, the SPAD sensor 21 according to the fourth embodiment includes the pixel selection unit 51, the pulse shaping unit 52, and the front end 53 in each pixel. Further, the SPAD sensor 21 according to the fourth embodiment includes the 0th to 23rd T flip-flops TFF0 to TFF23, OR circuits (examples of a first-stage logic circuit), a two-input OR circuit, two-input AND circuits (examples of a second-stage logic circuit), and a multiplexer circuit, which are allocated to the plurality of pixels.

Specifically, of the 0th to 23rd T flip-flops TFF0 to TFF23, the 0th and 1st T flip-flops TFF0 and TFF1 are disposed in the second pixel from the bottom in the right column, and the 2nd and 3rd T flip-flops TFF2 and TFF3 are disposed in the upper right pixel in FIG. 8. The 4th and 5th T flip-flops TFF4 and TFF5 are in the pixel adjacent to the upper right pixel in FIG. 8. In the three pixels continuously arranged downward from the pixel including the 4th and 5th T flip-flops TFF4 and TFF5 in FIG. 8, the 6th and 7th T flip-flops TFF6 and TFF7, the 8th and 9th T flip-flops TFF8 and TFF9, and the 10th and 11th T flip-flops TFF10 and TFF11 are disposed, respectively.

Further, the 12th and 13th T flip-flops TFF12 and TFF13 are disposed in the second pixel from the bottom in the second row from the left, and the 14th and 15th T flip-flops TFF14 and TFF15 are disposed in the top pixel in the second column from the left in FIG. 8. In the four pixels in the first column from left in FIG. 8, the 16th and 17th T flip-flops TFF16 and TFF17, the 18th and 19th T flip-flops TFF18 and TFF19, the 20th and 21st T flip-flops TFF20 and TFF21, and the 22nd and 23rd T flip-flops TFF22 and TFF23 are disposed, respectively.

That is, the 0th to 23rd T flip-flops TFF0 to TFF23 are arranged from the second pixel from the bottom in the right column in FIG. 8 sequentially in adjacent pixels such as the T flip-flop TFF0, the T flip-flop TFF1, the T flip-flop TFF2, . . . , and the T flip-flop TFF23 in order. As a result, the wiring between the T flip-flops can be shortened, the wiring area can be reduced, thereby improving the aperture ratio of each pixel.

Further, in the case of the SPAD sensor 21 used in the fourth embodiment, an OR circuit A[3] (an example of a first-stage logic circuit), an OR circuit B[2:3], and two two-input AND circuits 2AND are disposed in a pixel SPADCELL (an example of a third photoelectric conversion portion) at the lower right in FIG. 8. In the second pixel from the top in the left column in FIG. 8 includes a reset circuit RESET and a read circuit READ. Further, the bottom pixel in the second column from the left in FIG. 8 includes an OR circuit A[2], an OR circuit B[0:1], a two-input OR circuit 2OR, and a multiplexer MUX. Further, a pixel QUADSPAD0 (an example of a second photoelectric conversion portion), which is the second pixel from the top in the second column from the left in FIG. 8 includes an OR circuit A[0].

In the fourth embodiment, in order to collectively supply the output of the 16 pixels to a common 24-bit counter circuit 70 (in FIG. 9), the outputs of the 4 upper left pixels are collected to one OR circuit A[0]. Similarly, the outputs of the 4 upper right pixels are collected to one OR circuit A[1], the outputs of the 4 lower left pixels are collected to one OR circuit A[2], and the 4 outputs of the lower right pixels are collected to one OR circuit A[3]. Further, the outputs of the 4 upper left pixels and the 4 upper right pixels are collected to one OR circuit B[0:1], and the outputs of the 4 lower left pixels and the lower right 4 pixels are collected to one OR circuit B[2:3]. Then, the outputs of the OR circuit B[0:1] and the OR circuit B[2:3] are collected to the two-input OR circuit 2OR. As a result, the outputs of 16 pixels are collected in the order of 4 outputs, 8 outputs, and 16 outputs and supplied to the 24-bit counter circuit 70.

As in the SPAD sensor 21 illustrated in FIG. 8, arranging the pixels including only the T flip-flops adjacent to each other and collecting the logic circuits, such as the OR circuit, in other pixels can eliminate unnecessary wiring. This configuration can prevent decreases in the aperture ratio of the light-receiving area due to the wiring, thereby preventing a delay of the output signal.

That is, in the fourth embodiment, the output signals are collected by the OR circuits A[0], A[1], A[2], and A[3] for each of the four grids of the upper left grid (the light-receiving areas R0, R1, R4, and R5), the upper right grid (the light-receiving areas R2, R3, R6, and R7), the lower left grid (the light-receiving areas R8, R9, R12, and R13), and the lower right grid (the light-receiving areas R10, R11, R14, and R15). As a result, the parasitic capacitance of the wiring can be reduced, and the delay of the output signal can be minimized.

Switching of Division of T Flip-Flops

In the fourth embodiment, as described above, the 24-bit counter circuit 70 of the SPAD sensor 21 can be switched between the first mode to count outputs of the T flip-flops TFF0 to TFF23 as the 24-bit counter, and the second mode to separately count outputs of the lower 12-bit T flip-flops TFF0 to TFF11 and the higher 12-bit T flip-flops TFF12 to TFF23. The second mode is suitable when the SPAD sensor 21 is used as an indirect time-of-flight (ToF) sensor. Details will be described later.

Figure 9:
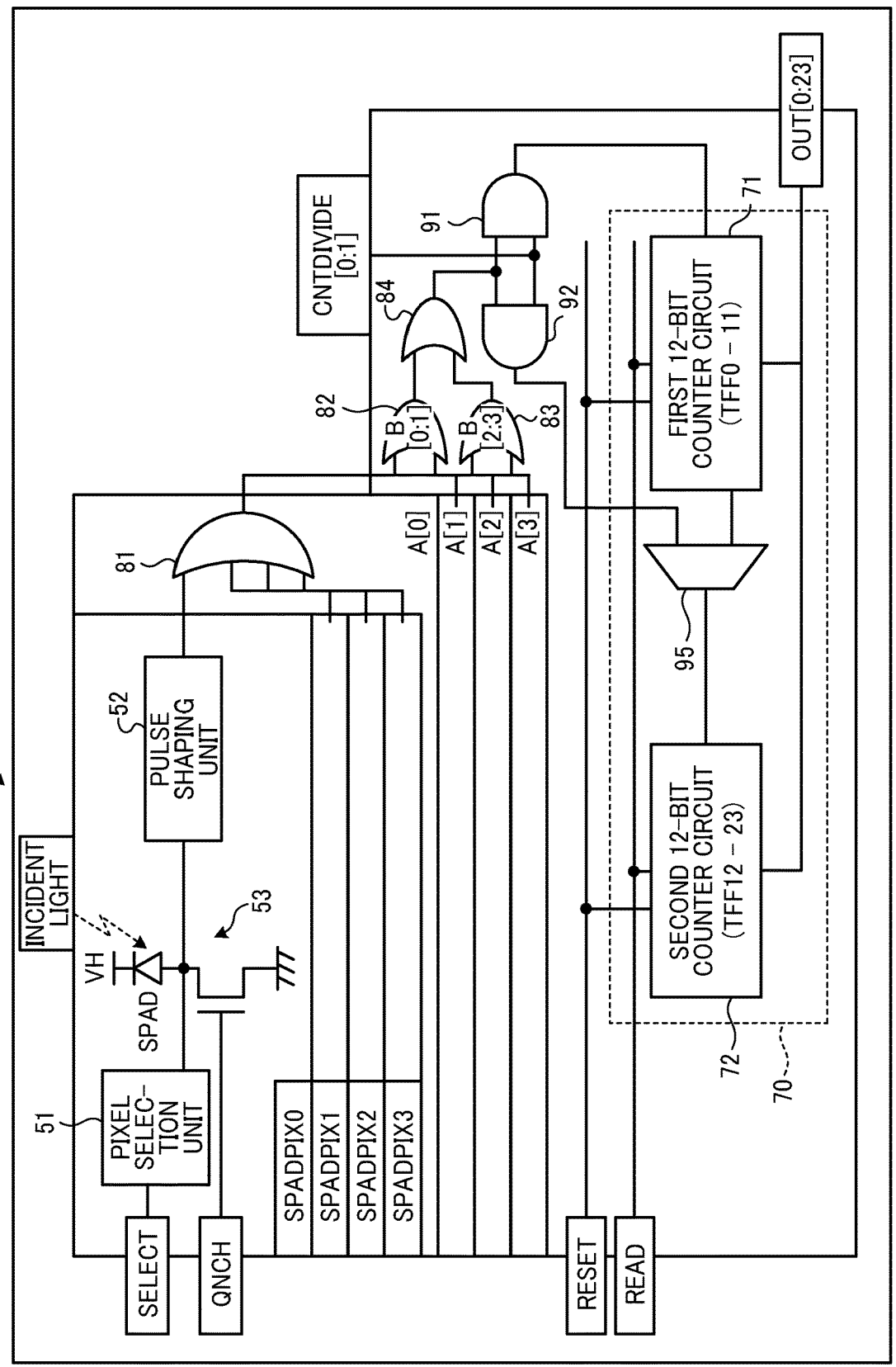
FIG. 9 is a diagram illustrating a circuit configuration of the SPAD sensor illustrated in FIG. 8.

FIG. 9 is a circuit diagram illustrating the above-mentioned switching between the first mode and the second mode. The configuration of each pixel is the same as that according to the first embodiment described above. The SPAD connected to the VH terminal operates in the Geiger mode, and the MOSFET of the front end 53 having the drain connected to the anode side of the SPAD functions as a quench resistor. The gate bias of the MOSFET is controlled via the QNCH terminal so that the quench resistance value can be changed from the outside.

The outputs of the above-mentioned four pixels on the upper left (SPADPIX0 to SPADPIX3), the outputs of the four pixels on the upper right, the outputs of the four pixels on the lower left, and the outputs of the four pixels on the lower right are input to a four-input OR circuit 81 (an example of a first-stage logic circuit), and the output signals A[0] to A[3] in response to the reaction of each SPAD can be output collectively. The first-stage logic circuit collects the count values from at least two bit counters. Of the output signals A[0] to A[3], the output signal A[0] and the output signal A[1] are supplied to a two-input OR circuit 82 (B[0:1]). Further, of the output signals A[0] to A[3], the output signal A[2] and the output signal A[3] are supplied to a two-input OR circuit 83 (B[2:3]). A two-input OR circuit 84 collects the respective output signals of the two-input OR circuit 82 (B[0:1]) and the two-input OR circuit 83 (B[2:3]), and supplies the output signals to a first AND circuit 91 and a second AND circuit 92.

In the fourth embodiment, the 24-bit counter circuit 70 is divided into a first 12-bit counter circuit 71 (an example of a lower-bit counter circuit) that counts the respective outputs of the 0th to 11th T flip-flops TFF0 to TFF11, and a second 12-bit counter circuit 72 (an example of a higher-bit counter circuit) that counts the respective outputs of the 12th to 23rd T flip-flops TFF12 to TFF23.

The first AND circuit 91, to which the output signals collected by the two-input OR circuit 84 is supplied, is connected to the first 12-bit counter circuit 71. The second AND circuit 92, to which the output signals collected by the two-input OR circuit 84 is supplied, is connected to a multiplexer 95 (an example of a switching control circuit). The two-input OR circuits 82 to 84, the first AND circuit 91, and the second AND circuit 92 are examples of a second-stage logic circuits.

The first 12-bit counter circuit 71 is also connected to the multiplexer 95. The multiplexer 95 selects one of the output signals from the second AND circuit 92 and the output signals counted by the first 12-bit counter circuit 71 and supplies the selected signals to the second 12-bit counter circuit 72.

With such a circuit configuration, the pulse signal output by each pixel reacting to one photon can be counted by the 24-bit counter circuit 70. Of the plurality of pixels, the pixel selected via the SELECT terminal becomes active and outputs the counted number of photons. As a result, the count value of only a given pixel among the 16 pixels can be obtained.

The count value is reset to "0" by a reset pulse supplied via the reset terminal RESET. Further, the count value is output via the output terminal OUT [0:23] based on the read pulse supplied via the read terminal READ.

Further, in the fourth embodiment, a high level "1" switching signal or a low level "0" switching signal is supplied from a switching control terminal CNTDIVIDE [0:1] to the first AND circuit 91 and the second AND circuit 92. As a result, the first 12-bit counter circuit 71 and the second 12-bit counter circuit 72 can be used as one 24-bit counter (first mode), or the first 12-bit counter circuit 71 and the second 12-bit counter circuit 72 can be used as the lower 12-bit counter (TFF0 to TFF11) and the higher 12-bit counter (TFF12 to TFF23), respectively, (second mode).

Use of the SPAD sensor as an indirect ToF sensor requires detecting the phase difference of the output signals. Therefore, the circuit is configured to prepare an up counter and a down counter for detecting the difference. From this point, the configuration to detect the count value with the two divided counters of the higher 12-bits counter and the lower 12-bits counter is preferable.

FIG. 10 is a timing chart when a SPAD sensor having a function of 24-bit/12-bit counter circuit switching is used as an indirect ToF sensor as described above. As described above, use of the SPAD sensor as an indirect ToF sensor requires the circuit configuration for detecting the phase difference of the output signals. Accordingly, an up counter and a down counter are provided to detect the difference.

That is, in the fourth embodiment, as described with reference to FIG. 9, the counter circuit is divided into two, namely, divided into the first 12-bit counter circuit 71 (TFF0 to TFF11) and the second 12-bit counter circuit 72 (TFF12 to TFF23), so that the SPAD sensor 21 can be used as an indirect ToF sensor.

That is, in the timing chart of FIG. 10, the pulse width of the light emission is synchronized with the timing of activating the 0th to 11th T flip-flops TFF0 to TFF11. The active period of the 12th to 23rd T flip-flops TFF12 to TFF23 is started simultaneously with the end of the active period of the 0th to 11th T flip-flops TFF0 to TFF11, and the length of the active periods are the same.

The reflected light signal is generated with a delay of ToF from the light emission signal. Therefore, the control circuit 3 calculates the ToF (time to reception of the reflected light of the light emitted to the object 40) from the difference in signal amount between the first 12-bit counter circuit 71 (0th to 11th T flip-flops TFF0 to TFF11) and the second 12-bit counter circuit 72 (12th to 23rd T flip-flops TFF12 to TFF23).

For example, when the difference in signal amount between the first 12-bit counter circuit 71 and the second 12-bit counter circuit 72 is 0, the signal amount of the 0th to 11th T flip-flops TFF0 to TFF11 is the same as the signal amount of the 12th to 23rd T flip-flops TFF12 to TFF23. In this case, the control circuit 3 calculates ½ of the light projection pulse width (light projection time) as the length of time (ToF) to when the reflected light of the light emitted to the object is received.

As is clear from the above description, the LIDAR apparatus according to the fourth embodiment includes the lower-bit counter circuit (the first 12-bit counter circuit 71) and the higher-bit counter circuit (the second 12-bit counter circuit 72), and calculates the phase difference of the output signals of the counter circuits. Thus, the LIDAR apparatus can calculate the time (ToF) to when the reflected light of the light emitted to the object is received. Therefore, the SPAD sensor can be used as an indirect ToF sensor, and the same effects as those of the above-described embodiments can be obtained.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A light receiver comprising:
   a plurality of photoelectric conversion portions arranged in an array each of the photoelectric conversion portions including:
      a photoelectric conversion element configured to receive light; and
      a pulse generator configured to generate a pulse signal corresponding to an amount of light received by the photoelectric conversion element; and
   a plurality of bit counters, wherein each bit counter is provided in a corresponding one of the plurality of photoelectric conversion portions, each bit counter being configured to count the pulse signal of the pulse generator of the corresponding photoelectric conversion portion,
   wherein the plurality of bit counters are sequentially disposed in an order from the bit counter configured to output a count value of the lowest bit to the bit counter configured to output a count value of the highest bit, and are continuously arranged in a serpentine or spiral shape.

2. The light receiver according to claim 1, wherein the bit counters are T flip-flops.

3. The light receiver according to claim 1, further comprising a counter circuit configured to:
   collectively count respective count values from the plurality of bit counters; and
   generate a collective light-receiving signal from the count values.

4. The light receiver according to claim 1, further comprising:
   a plurality of first-stage logic circuits each of which is configured to collect count values from at least two of the plurality of bit counters; and
   a second-stage logic circuit configured to collect outputs from the plurality of first-stage logic circuits.

5. The light receiver according to claim 4,
   wherein each of the plurality of photoelectric conversion portions includes:
      a first photoelectric conversion portion including the bit counter and not including the first-stage logic circuit and the second-stage logic circuit; and
      one of a second photoelectric conversion portion and a third photoelectric conversion portion,
      the second photoelectric conversion portion including the first-stage logic circuit and not including the bit counter and the second-stage logic circuit,
      the third photoelectric conversion portion including the first-stage logic circuit and the second-stage logic circuit and not including the bit counter.

6. The light receiver according to claim 4, further comprising:
   a higher-bit counter circuit configured to count higher bits output from the second-stage logic circuit;
   a lower-bit counter circuit configured to count lower bits output from the second-stage logic circuit; and
   a switching control circuit configured to perform switching between a first mode and a second mode, the first mode in which both the higher-bit counter circuit and the lower-bit counter circuit count the outputs from the second-stage logic circuit, the second mode in which one of the higher-bit counter circuit and the lower-bit counter circuit counts the outputs from the second-stage logic circuit.

7. A ranging device comprising:
   a light source configured to emit light to an object;
   the light receiver according to claim 6; and
   a control circuit configured to calculate ½ of a time of emission of the light from the light source to the object as a time to reception of reflected light of the light emitted to the object, in response to a detection result that a phase difference between the output signal from the higher-bit counter circuit and the output signal from the lower-bit counter circuit in the first mode is 0.

8. The light receiver according to claim 4, wherein the second-stage logic circuit is a two-input AND circuit.

* * * * *